US005889258A

United States Patent [19]

Lubomirski et al.

[11] Patent Number: 5,889,258

[45] Date of Patent: Mar. 30, 1999

[54] HIGH TEMPERATURE HEATING APPARATUS

[76] Inventors: Dimitri Lubomirski; Assaf Thon, both of 69 Sderot Hanassi, Haifa 34643, Israel

[21] Appl. No.: 764,797

[22] Filed: Dec. 12, 1996

[51] Int. Cl.$^{6}$ .................... A21B 1/00

[52] U.S. Cl. .................... 219/405; 219/407; 219/408; 219/390; 392/416; 392/418

[58] Field of Search .................... 219/405, 407, 219/408, 411, 390; 392/416, 418

[56] References Cited

U.S. PATENT DOCUMENTS

| | | | |
|---|---|---|---|
| 5,179,677 | 1/1993 | Anderson | 392/411 |
| 5,268,989 | 12/1993 | Moslehi | 392/418 |
| 5,515,605 | 5/1996 | Hartmann | 392/419 |
| 5,536,918 | 7/1996 | Ohkase | 219/390 |
| 5,683,518 | 11/1997 | Moore | 219/405 |

OTHER PUBLICATIONS

C. Schlefinger, B. Adams, C. Yarling; Ripple technique: a non–contact wafer emissivity and temperature method for RTP; Mat. Res. Soc. Symp. Proc. vol. 224, 1991 Materials Research society.

*Primary Examiner*—Teresa J. Walberg
*Assistant Examiner*—Quan Nguyen
*Attorney, Agent, or Firm*—McDermott, Will & Emery

[57] ABSTRACT

A novel electrically power heater for heating samples to very high temperatures is disclosed. The heater includes a heater base having a plurality of concentric circular rings. Each ring includes a plurality of heat lamps coupled to the heater body. The height of each concentric ring is variable and be set during design to any desirable height. In one embodiment, the height of each of the concentric rings is adjusted so as to form a contiguous upwardly sloping arc from the outermost ring to the innermost ring. In another embodiment, the height of the concentric rings is adjusted so as to form a combination of upwardly and downwardly sloping arcs. In both embodiments, the lower surface of the heater body is shaped to form a reflector. The reflector for each ring consists of two portions, each substantially elliptically shaped so as to greatly reduce back reflections through the filament of the heat lamp. Utilizing circularly shaped rings of heat lamps functions to focus and more evenly illuminate the sample, typically a silicon wafer. The light intensity of each ring can be controlled individually permitting the fine tuning of the energy distribution over the surface of the wafer.

5 Claims, 4 Drawing Sheets

HIGH TEMPERATURE HEATING APPARATUS

FIELD OF THE INVENTION

The present invention relates generally to heater devices and more particularly relates to a high temperature heater for use in the processing of semiconductor substrates during the manufacture of semiconductor integrated circuit devices.

BACKGROUND OF THE INVENTION

Heaters for the rapid thermal processing of semiconductor substrates during the manufacture of integrated circuits are known in the art. Such heaters are used for annealing, heating and other purposes during the manufacture of integrated circuits. Some conventional heaters are composed of a flat array of heating elements, such as halogen heat lamps. The combination of multiple heating elements electrically wired together is sufficient to provide the required amount of heat for wafer processing. However, with this type of heater, it is difficult to control the heat energy distribution falling on the wafer due to the characteristics of the individual heat lamp elements and their associated reflectors. This poor control of the heat energy distribution results in low power consumption efficiency.

Also known in the art is a heater configuration that uses an array of individual heating elements positioned in hollowed out cylindrical openings in the heater body. Each individual lamp can be considered a point source of heat illuminating a relatively small area of the wafer. This configuration permits greater control over the heat illumination of the wafer. However, this configuration is less efficient than the previous one described due to the large number of multiple reflections which can be responsible for an energy loss in the order of 30%. The multiple reflections are generated because the heat lamp is mounted inside a cylindrical cavity. Although the interior surface is a polished reflector, the geometry of the cylinder is such that a significant amount of the heat is not reflected directly out of the opening. Multiple reflections, besides being wasteful, cause unnecessary additional heating of the filament, reducing the life of the heat lamp, decreasing the efficiency of the heater, increasing the number of heat elements required and consequently the electrical power required. In addition, the machining required to form the cavities in the heater body is complex and expensive. Also, the angular energy distribution of such a heater is non homogeneous due to the geometrical restrictions of each socketed or cavity reflector.

SUMMARY OF THE INVENTION

Accordingly, it is an object of the present invention to provide a high temperature heater that overcomes the disadvantages and limitations of the prior art.

It is another object of the present invention to provide a high temperature heater whose heat illumination pattern has high uniformity and homogeneity.

Another object of the present invention is to provide a high temperature heater that can generate uniform and controlled heating at a desired heat rate.

Yet another object of the present invention is to provide a high temperature heater that minimizes the reflection of heat into the filament of the heat lamps.

Another object of the present invention is to provide a high temperature heater that has a high degree of spatial controllability.

According to the present invention, there is provided an electrical heater apparatus for heating an article, such as a semi-conductor wafer, to a high temperature, comprising: a table having a horizontal supporting surface for supporting the article to be heated in a horizontal position; a heater body overlying the table and carrying a circular, dome-shaped, reflector array including a plurality of concentric reflector rings facing downwardly towards the table; and a plurality of heat lamps located in end-to-end relation in each of the reflector rings; each of the heat lamps being of a linear configuration and disposed parallel to the horizontal supporting surface; each of the heat lamps being oriented with its longitudinal axis in the circumferential direction of the respective reflector ring, and its transverse axis in the radial direction of the circular reflector array.

According to further features in the described preferred embodiment, the heat lamps in each reflector ring are in staggered relationship with respect to those in the next adjacent ring, such that most of the heat lamps in each ring are not located in radial alignment with the heat lamps in the adjacent rings. Each heat lamp includes a filament which is substantially parallel to the horizontal supporting surface.

In addition, the reflector comprises a substantially parabolic shape having a reflectorized coating thereon. The reflector comprises a split reflector having a left and a right portion, the left and right portion being substantially elliptical in shape and having a reflectorized coating thereon, the left and the right portions functioning to reduce back reflections through the filaments of the plurality of heat lamps. Also, the heater body is constructed from metal.

BRIEF DESCRIPTION OF THE DRAWINGS

The invention is herein described, by way of example only, with reference to the accompanying drawings, wherein.

DETAILED DESCRIPTION OF THE INVENTION

Figure 1:
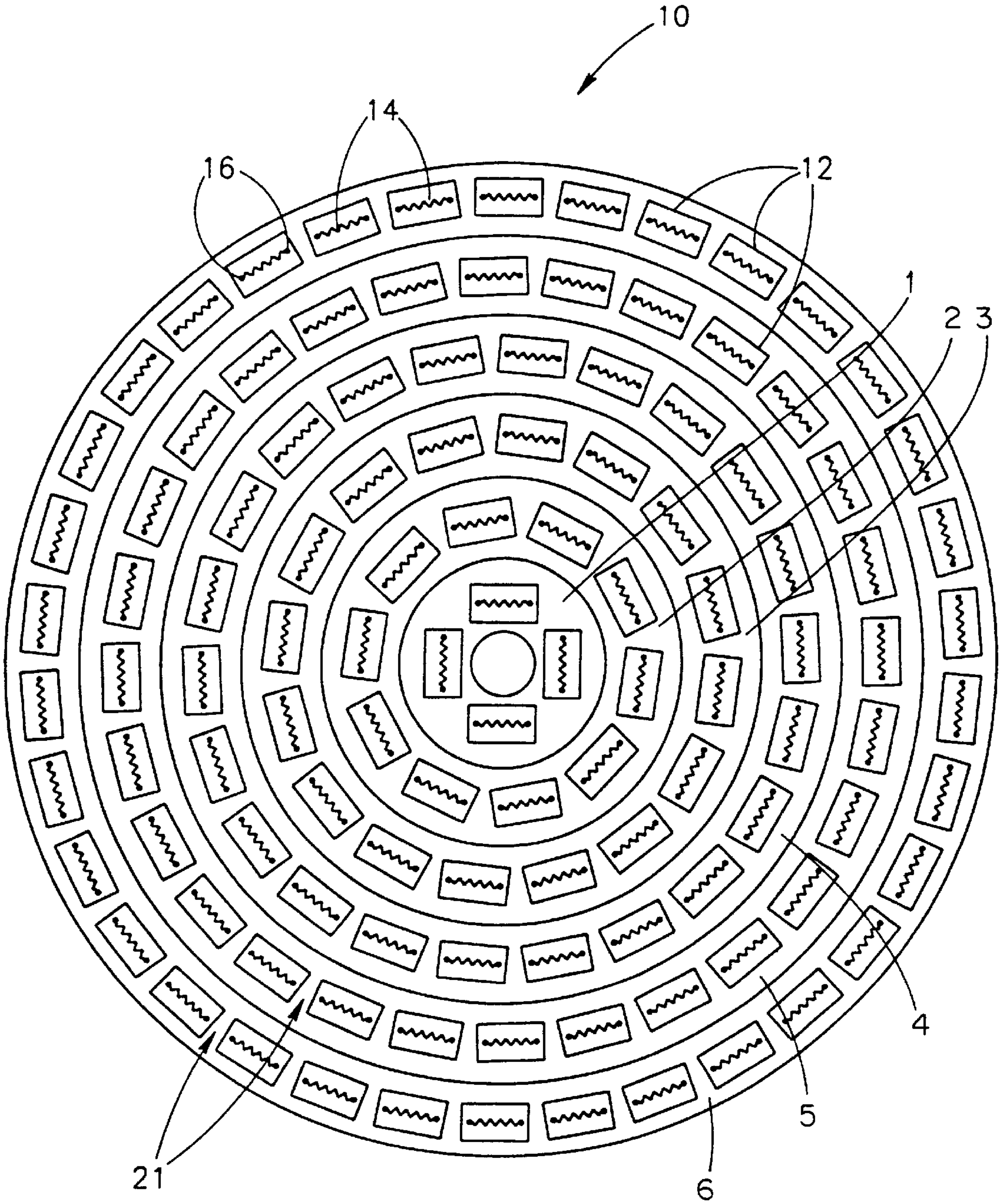
FIG. 1 is a top plan view illustrating the concentric ring architecture of a heater constructed in accordance with a preferred embodiment of the present invention.

The electrical heater apparatus illustrated in the drawings is intended for heating a semi-conductor wafer to a high temperature. As shown particularly in FIG. 3, it comprises a table 2 having a horizontal supporting surface for supporting the wafer 4 to be heated while in a horizontal position. The heater apparatus further includes a heater body, generally designated 10, overlying the table and carrying a reflector array including a plurality of concentric reflector rings facing downwardly towards the table. Each concentric reflector ring includes a plurality of heat lamps 12 located in end-to-end relation so as to completely fill each reflector ring. The heater body 10 formed with the reflector array is of a circular (FIG. 1), dome-shaped (FIGS. 2, 3) configuration, with the heat lamps disposed parallel to the horizontal supporting surface of table 2 supporting the wafer 4 to be heated. As shown in FIG. 1, each heat lamp 12 is of a linear configuration and is oriented with its longitudinal axis in the circumferential direction of the respective reflector rings, and its transverse axis in the radial direction of the circular reflector array heated by the heater body 10.

In the example illustrated in the drawings, the heater body 10 comprises six concentric rings 21. The heater 10 comprises six concentric rings 21 wherein each ring is made up of individual heat lamp 12. The rings are labeled ring 1 through ring 6 with ring 1 corresponding to the innermost ring and ring 6 to the outermost ring. The heat lamps 12 are preferably low power horizontal filament spot lamps such as halogen lamp model JDC120V-800WC manufactured by Ushio, Tokyo, Japan. Each heat lamp 12 comprises a filament 14 that is mechanically and electrically connected to a pair of filament posts 16. The electrical power supplied to each ring is controlled individually. An electrical power control circuit provides the necessary control circuitry to provide independent control of each concentric ring. A common bus wiring scheme may also be used to connect each heat lamp to the electrical power source. An electrical power supply is provided that is suitably designed to provide sufficient electrical power to all the individual heat lamps.

For the example heater shown in FIG. 1, the following table lists the number of heat element used within each ring. Note that heaters having a larger or smaller number of rings and a larger or smaller number of heat lamps within each ring can also be constructed without departing from the spirit of the present invention.

| Ring Number | Number of Lamps |
|---|---|
| Ring 1 | 4 |
| Ring 2 | 10 |
| Ring 3 | 16 |
| Ring 4 | 22 |
| Ring 5 | 28 |
| Ring 6 | 34 |

A benefit of configuring the individual heat lamps in concentric rings is that a homogenous angular energy distribution can be achieved. In addition, each radial zone can be controlled with a high degree of precision. Further, the lamp radial distribution of the rings is not aligned symmetrically but rather an angular shift between each ring is introduced in order to improve energy uniformity for all angular or radial directions. That is, and as shown particularly in FIG. 1, the heat lamps 12 in each reflector ring are in a staggered relation with respect to those in the adjacent rings such that most the heat lamps in each ring are not in radical alignment with the heat lamps in the adjacent rings.

Figure 2:
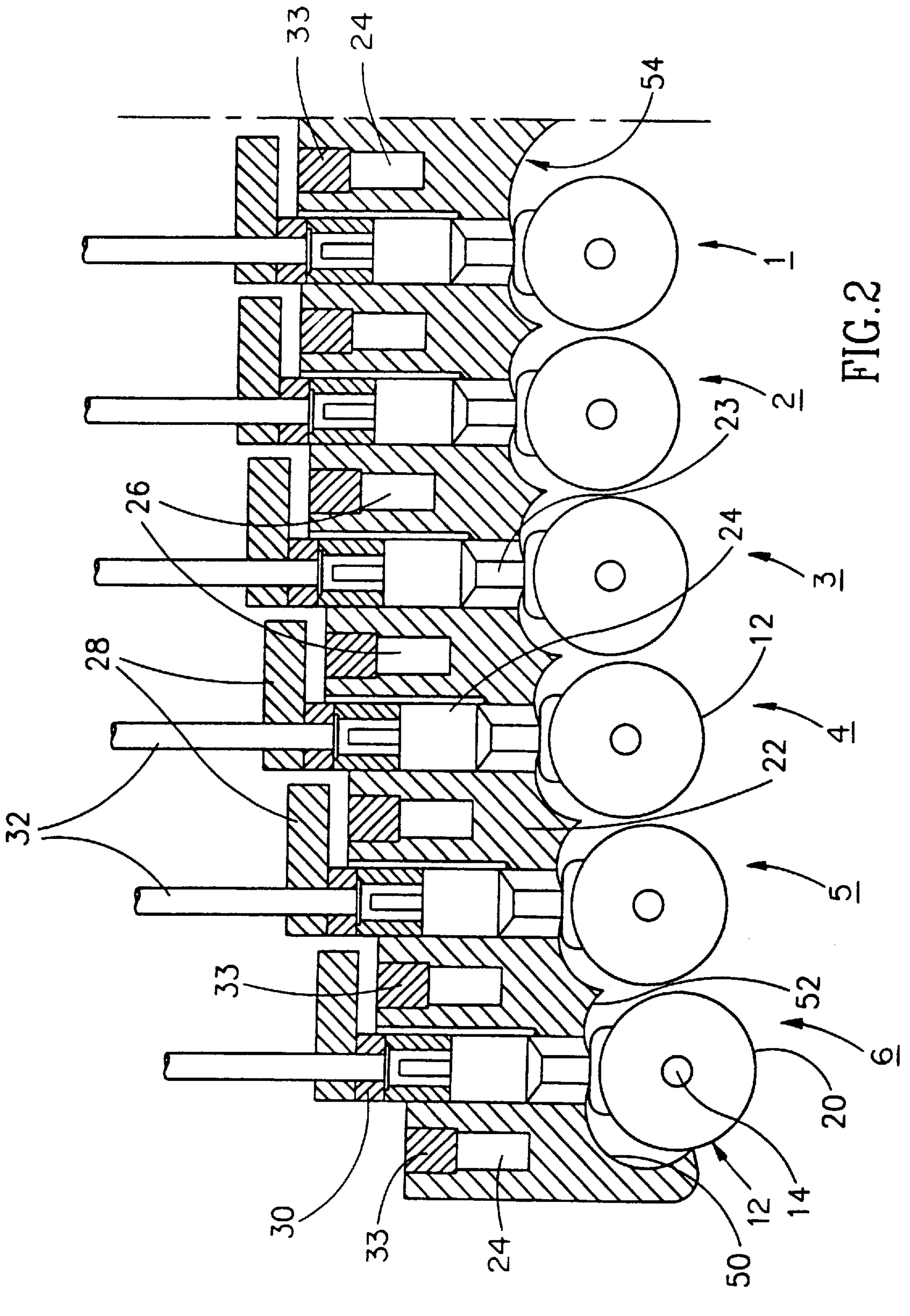
FIG. 2 is a partial sectional view of a heater of the present invention showing the multiple ring structure and the position of the constituent rings in the z-axis.

A cross sectional view of the radius of the heater of the present invention showing the multiple ring structure and the position of the constituent rings in the z-axis is shown in FIG. 2. The heater 10 is constructed from a heater body or housing 22 onto which the heat lamps 12 are mounted. Shown are the glass tube 20, filament 14 and mounting post 23 of each heat lamp 12. Each mounting post 23 is coupled to a spring 2 (not shown) which is fixed within each mounting channel in the heater body. The mounting post 23 is fixably connected to a socket 30. The spring serves to hold the heat lamp in the socket. Each socket is mounted on a socket mounting ring 28. Electrical power to each heat lamp is conveyed via the lamp terminals and wires 32. The heater body also comprises channels 24 for the flow of water used to help cool the heater during operation.

The lower surface of the heater body comprises a reflector 54. In a preferred embodiment, the reflector for each ring comprises a split reflector having two portions: an inner portion 52 and an outer portion 50. The inner and outer portions function in combination to reflect the heat and light energy generated by each heat lamp. Using a split reflector eliminates wasteful unwanted excess heating of the filament due to back reflections of light into the filament. As stated previously, additional heating of the filament due to reflections reduces both the life of the heat lamp and its efficiency.

In a preferred embodiment, the heater body 22 is constructed of aluminum and the reflectors 54 are coated with a reflective coating of nickel and gold. Aluminum is preferred because of its light weight properties, ease of manufacture and its high thermal conductivity. The water channels 24 within the heater body are constructed by machining channels around between each ring and then welding an aluminum plug 33 to encase the channel. A benefit of using welding to form the channels is the possibility to rework portions of the channel in the event a leak forms. Each of the seven water channels has a welded inlet and an outlet tube (not shown) for the entry and exit, respectively, of the cooling water. The flow rate within each channel is controlled so as to achieve uniform cooling from the shorter inner rings to the longer outer rings.

The axis symmetry of the ring configuration of the heater 10 functions to illuminate the item to be heated evenly in all angular directions and maintains the symmetry of the heat applied even in the center of the heater. Any changes in the flux intensity of each ring can be made in the radial direction by manipulating the power applied to each toriodal ring.

Figure 3:
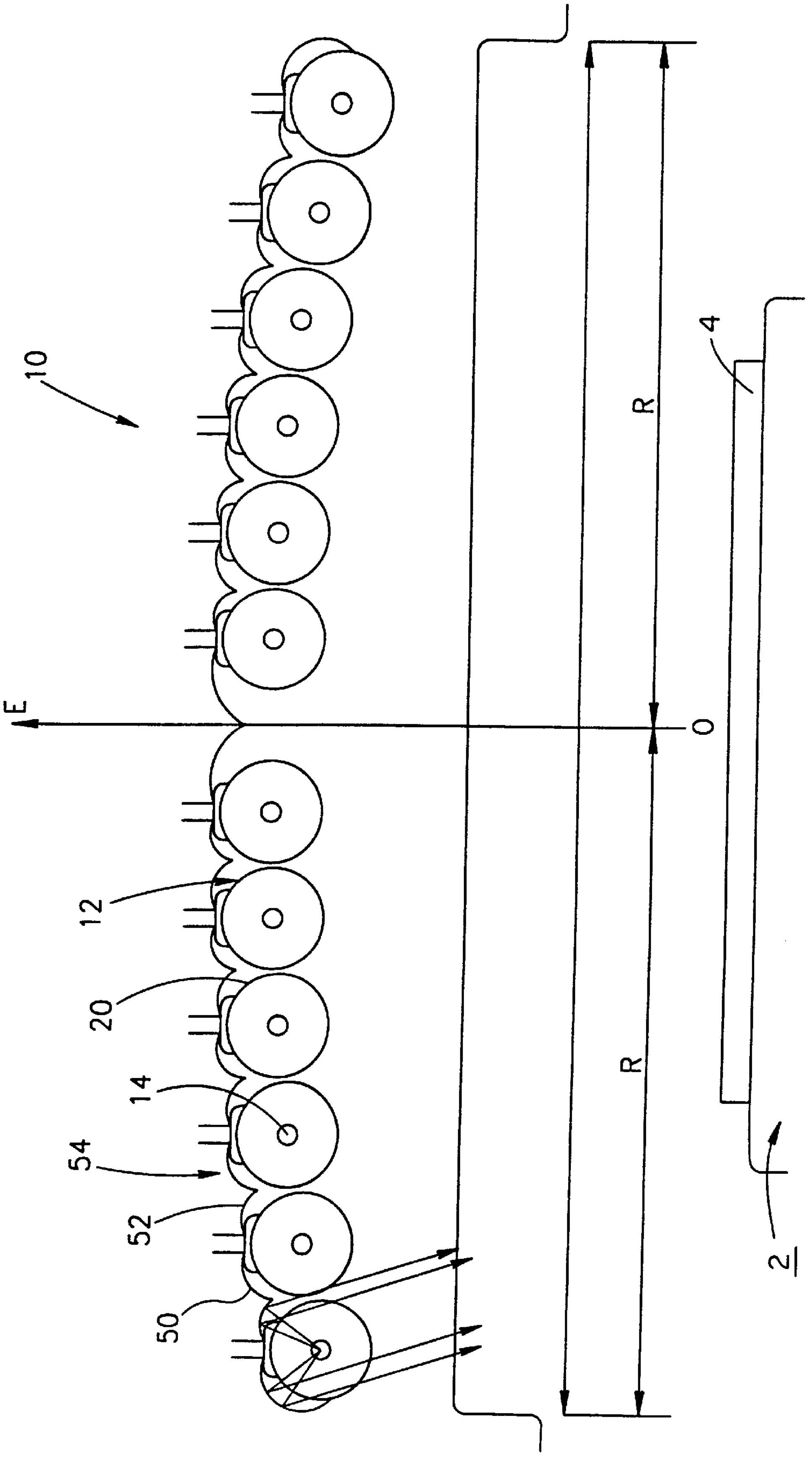
FIG. 3 is a plot graph illustrating the magnitude of the energy illuminating the wafer surface as a function of the distance from the center of the wafer.

As stated previously, one application of the heater of the present invention is to heat silicon wafers during the manufacture of integrated circuit devices such as during the annealing process. FIG. 3 illustrates a partial schematic representation of the heater 10 illuminating a silicon wafer 4. In addition, the Figure shows a plot graph illustrating the magnitude of the energy illuminating the wafer surface as a function of the distance from the center of the wafer. The radius R is the radius of the heater and E represents the level of the illuminating energy. From the graph one can see that the energy emitted by the lamps uniformly illuminates the wafer 4. Thus, the wafer need not be rotated during heating, as is the case with conventional heaters.

With reference to FIG. 2, the concentric rings 21 of the heater are positioned in the z-axis (i.e., height above the item to be heated) in a gradual upward sloping arc from the outer edge to the center of the heater. The heat lamps are adjusted vertically by placing different length mounting posts between the heater body and the socket mounting ring. Using a three dimensional reflector configuration permits a high degree of freedom to maximize the portion of the light centered on the wafer and to minimize the amount of light falling around the wafer. In addition, the shape of the split reflector pattern provides high tangential homogeneity of each torus or ring. Although a large number of spot lamps are required, the pattern yields high illumination homogeneity within each ring permitting the use of reduced power lamps with an accompanied increased life span of each lamp. Using at least six heater rings enables better radial control of the light illumination. A higher number of rings permits better control at the expense of complexity and increased cost, while a lower number of rings reduces controllability but uses less hardware.

It is noted that the heater configuration shown in FIG. 2 is an example of only one possible configuration of the heater rings. Other heater ring configurations are possible where the heater rings can be set to any height above the sample creating an almost limitless number of possible configurations. One skilled in the art can configure the number of rings and the height of each ring of the heater of the present invention to yield any desired heat illumination pattern.

Two additional configurations of the heater rings include a configuration whereby the heater rings form a downwardly sloping arc from the outermost ring to the innermost ring. In another configuration the some of the heater rings slope downwardly and some upwardly to form a combination.

Figure 4:
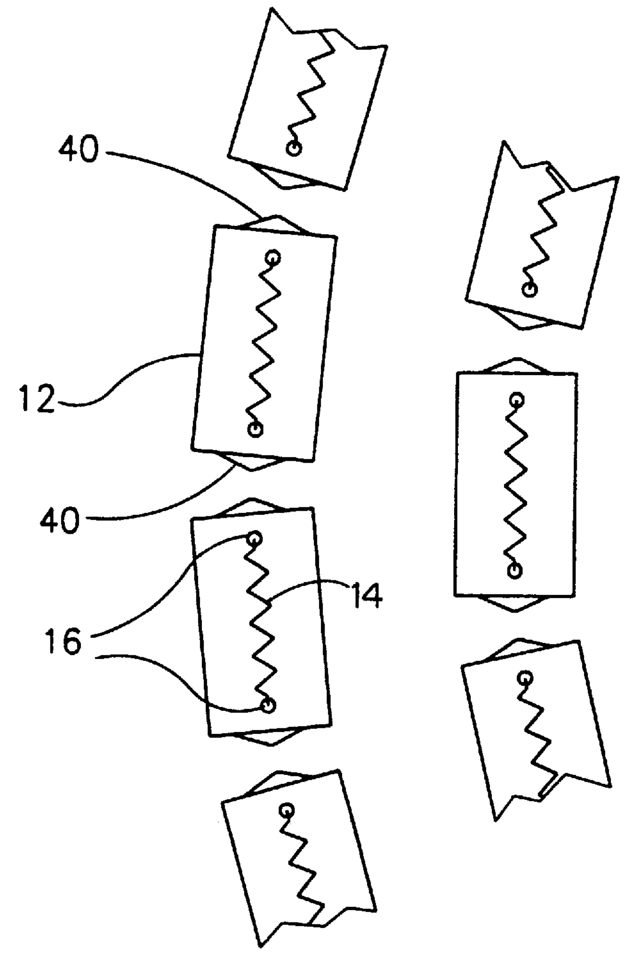
FIG. 4 is a high level block diagram illustrating the cooling air inlets adjacent each heat lamp.

The heater 10 also utilizes air flow to help cool the lamps. Holes near the seal between the lamp and the heater body permit air to flow over the lamps. A high level block diagram illustrating the cooling air inlets adjacent each heat lamp is shown in FIG. 4. An air inlet hole 40 is positioned adjacent the sides of each lamp 12 permitting air to flow around and over each of the lamps.

While the invention has been described with respect to a limited number of embodiments, it will be appreciated that many variations, modifications and other applications of the invention may be made.

What is claimed is:

1. An electrical heater apparatus for heating an article, such as a semi-conductor wafer, to a high temperature, comprising:

a table having a horizontal supporting surface for supporting the article to be heated in a horizontal position;

a heater body overlying said table and carrying a circular, dome-shaped, reflector array including a plurality of concentric reflector rings facing downwardly towards said table;

and a plurality of heat lamps located in end-to-end relation in each of said reflector rings; each of said heat lamps being of a linear configuration and disposed parallel to said horizontal supporting surface;

each of said heat lamps being oriented with its longitudinal axis in the circumferential direction of the respective reflector ring, and its transverse axis in the radial direction of the circular reflector array.

2. The apparatus according to claim 1, wherein the heat lamps in each reflector ring are in staggered relationship with respect to those in the adjacent rings, such that most of the heat lamps in each ring are not in radial alignment with the heat lamps in the adjacent rings.

3. The apparatus according to claim 1, wherein each of said heat lamps includes a filament which is located substantially parallel to said horizontal supporting surface.

4. The apparatus according to claim 1, wherein said heater body is an integral body of heat resistant material, and said reflector array is constituted of concentric rings formed in said body coated with reflector material.

5. The apparatus according to claim 4, wherein said heater body is of aluminum and is formed with a plurality of water cooling channels therethrough.

* * * * *